July 7, 1970 S. H. GROSSMAN 3,519,988

ERROR CHECKING ARRANGEMENT FOR DATA PROCESSING APPARATUS

Filed May 17, 1965 2 Sheets-Sheet 1

INVENTOR
SHERMAN H. GROSSMAN
BY Fred Jacob
ATTORNEY

ERROR CHECKING ARRANGEMENT FOR DATA PROCESSING APPARATUS

Filed May 17, 1965 2 Sheets-Sheet 2

INVENTOR
SHERMAN H. GROSSMAN

BY Fred Jacob
ATTORNEY

United States Patent Office 3,519,988
Patented July 7, 1970

3,519,988

ERROR CHECKING ARRANGEMENT FOR DATA PROCESSING APPARATUS

Sherman H. Grossman, Brookline, Mass., assignor to Honeywell Inc., Minneapolis, Minn., a corporation of Delaware Filed May 17, 1965, Ser. No. 456,320
Int. Cl. G11b 27/22; H03k 13/34
U.S. Cl. 340—146.1 9 Claims

ABSTRACT OF THE DISCLOSURE

A checking technique for use in a multi-channel magnetic tape recording system is described that detects the dropout of one or more data frames of information. Clock pulses which are generated for each data frame that is successfully read out, initiate a frame present signal of a duration in excess of one frame period interval. When a data frame is not detected, a frame absent signal is generated that initiates the counting of a frame counter. An error signal is generated when the frame counter exceeds a predetermined number. Read backward operation is also herein implemented.

The present invention relates in general to a new and improved checking technique, and in particular to a technique for detecting the dropout of one or more frames of information successively recorded on a medium.

Although the invention is not so limited, it will be explained with reference to a multi-channel magnetic tape recording system. The information is customarily recorded along the length of the tape in the form of records, successive records being spaced from each other by an approximately constant inter-record gap. Within each record, successive frames of data are recorded at constant frame intervals. A data frame may consist of a group of binary digits respectively recorded in the separate channels of the tape and in substantial mutual alignment transverse to the length of the tape. In one recording technique which is commonly employed, a binary ONE is represented by the presence of a recorded transition, while a binary ZERO is represented by the absence of a transition.

In order to read out data reliably, clocking signals must be provided which open a "window" for the readout of each frame, in order to separate the information so obtained from any noise signals or other disturbances on the line. Where the width of the tape is sufficiently large, a separate clock channel may be provided in which clock pulses of a predetermined width are recorded in synchronism with the recording of each data frame. Each clock pulse read out enables a separate gate for each data channel to pass the data read out during the clock interval.

Tape skewing, i.e. the movement of the tape at an angle to its normal direction of motion, is an ever-present problem in tape transports. The occurrence of skewing during the recording of information on tape displaces the recorded pulses with respect to each other along the length of the tape. Upon readout of a tape so recorded, a bank of perfectly aligned read heads will produce readout pulses corresponding to the several tape channels which are displaced in time from each other. The same results in obtained when tape skewing occurs during readout, even though no skewing was present during the recording of data by a bank of aligned recording heads. Under worst-case conditions, the time displacement of the pulses read out in a given frame may be cumulative if skewing occurs both during the recording and during readout. The problem is further aggravated by the positioning of the magnetic heads, which are rarely aligned perfectly with respect to each other.

At relatively low recording densities, the above-discussed skewing problem is tolerable since the clocking "window" can be made sufficiently large to accept the earliest as well as the last-occurring readout pulse corresponding to a given frame. At higher recording densities, however, it has been found advantageous to use narrower tape width in order to limit the time displacements of the readout pulses corresponding to a given frame. Where narrow tape widths are employed, e.g. widths of the order of one-half inch, the number of parallel channels must, of necessity, be limited. Under these conditions, the clock channel is frequently dispensed with in favor of a data-bearing channel and a self-clocked readout technique, i.e. a technique wherein clock pulses are generated from the data contained within each frame, is employed.

If a recording technique is employed wherein the binary 1's and 0's are designated by the presence or absence respectively, of polarity transitions, it follows that each data frame must contain at least one such transition. In the absence of such a transition, no clock pulse is generated and hence the frame is not read out. Such a requirement may be implemented through the proper use of a parity bit which is customarily associated with the data bits of each frame. Thus, if odd parity is chosen as a criterion, i.e. if the total number of bits contained in each frame must add up to an odd number, a legal data frame wherein each data bit is binary 0 must contain a binary 1 parity bit. In this manner, the requirement for odd parity, as well as for the presence of one transition per frame are both met.

While the parity check, which must be carried out in clock pulse synchronism, is a relatively powerful tool for detecting an error within a frame, it is not an absolute check inasmuch as it is incapable of showing up balancing errors. Thus, if two bits in separate channels within a single frame were to be erroneously complemented, the frame would still parity-check correctly. In order to provide additional means for indicating such errors, a so-called long check is conventionally employed. With this latter technique, each channel of an entire record additionally contains a long check digit, which is chosen to bring the total number of bits in the channel to a predetermined number, e.g. an even number. Characteristically, the long check bits associated with a given record constitute a separate frame which is spaced from the last data frame of the record a distance greater than the frame period interval.

The long check is subject to error in a manner similar to the parity check. Thus, the complementing of an even number of bits within a given channel will produce an undetectable error. Together with the parity check, however, a powerful and reliable tool is provided for detecting errors in a given record. A further precaution against the occurence of errors may be taken by providing a bank of read heads immediately adjacent to the recording heads. Thus, a parity check of each frame can be carried out immediately following the recording of the frame and a long check is obtained immediately following the end of a record.

All safeguards to the contrary notwithstanding, however, prior art equipment of this type has not proved to be fully reliable and errors caused primarily by the presence of dust between the heads and the magnetic tape have occurred at an impermissibly high rate. The presence of a speck of dust between the head and the tape may prevent recording from taking place on the tape or, at a particular location, it may prevent the readout of the recorded information. The problem is particularly acute where high density recording is employed. Here, the size of the magnetized spots on the tape itself is relatively small, while the frame packing density is high. Hence, the probability of losing data is materially enhanced.

As previously explained, a clock pluse must be present in order for a frame parity check to be carried out. The generation of the clock pulse is guaranteed by the requirement that each data frame contains at least one transition, i.e. at least one binary 1. If a data frame contains only a single transition and the latter is lost due to the presence of dust, either during recording or during readout, no clock pulse is generated. Accordingly, no parity check will be carried out and the error, unless detected by the long check, will escape attention. If, as freqquently happens the dust speck remains between the magnetic head and the tape sufficiently long to wipe out a pair of successive transitions, the long check will similarly fail to show up the error. In such a case, frame dropout is said to occur, since the entire data frame passes undetected.

Where wide tapes are in use, a separate clock channel may be employed. Whether readout occurs under the control of a clock track, or whether it is self-clocked, the recording of data in a relatively large number of channels renders the occurrence of only a single transition per frame relatively rare. Indeed, with a large number of channels more than one transition per frame can be guaranteed without undue difficulty. Under such conditions, the loss due to dust of a single transition does not result in the dropout of the entire frame, since the remaining transitions will serve to generate the clock pulse. Thus, a parity check can be carried out to detect the error. The problem is different when the width of the tape does not permit the recording of data in a large number of tracks. Here it becomes impractical to guarantee more than one transition per frame and hence frame dropout becomes a serious problem.

The frame dropout problem has defied a satisfactory solution heretofore, with the result that the reliability of magnetic recording and readout systems employing narrow tapes has suffered. The absence of a clock pulse cannot be compensated for by referencing the beginning or end of a record. Thus, while the frame period interval is relatively constant within the limitations resulting from tape skewing and the imperfect alignment of a bank of magnetic heads, the inter-record gaps are not precisely fixed. Nor is it practical to do so without going to undue expense. This is similarly applicable to the spacing between the long check frame and the last data frame of a record, such spacing being only approximately constant. Indeed, the long check frame, which is not a data frame, may consist entirely of binary 0's so that the effective inter-record gap extends from the last data frame of one record to the first data frame of a subsequent record. Finally, the length of a record is not fixed and may vary from only a few frames to a maximum of 32,000 frames under certain conditions.

According, it is the primary object of the present invention to provide a technique whereby the foregoing problems are overcome.

It is another object of the present invention to provide a technique for the detection of frame dropout, which renders the readout of data reliable to an extent heretofore unattainable.

It is a further object of the present invention to provide a frame dropout detection technique which is applicable to high density recording, particularly on a medium where the number of data channels per frame is relatively small.

It is an additional object of the present invention to provide a simple and reliable frame dropout detection technique which can be economically implemented.

These and other objects of the present invention, together with the features and advantages thereof, will become apparent from the following detailed specification with reference to the accompanying drawings in which.

Figure 1A:
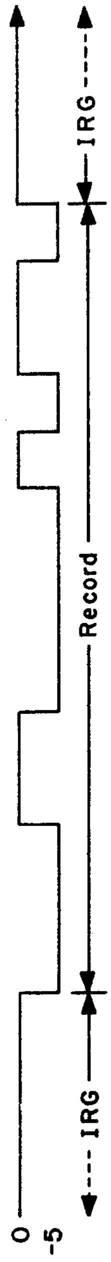
FIG. 1 illustrates in schematic form the arrangement of information on a medium.

With reference now to the drawings, FIG. 1A illustrates a representative bi-level waveform of the information recorded in a single channel of a magnetic tape medium. As explained above, the presence of a transition is representative of a binary 1, while the absence of a transition denotes binary 0. In the illustrated embodiment a 0 volt and a —5 volt level are employed, although the invention is not so limited.

Figure 1B:
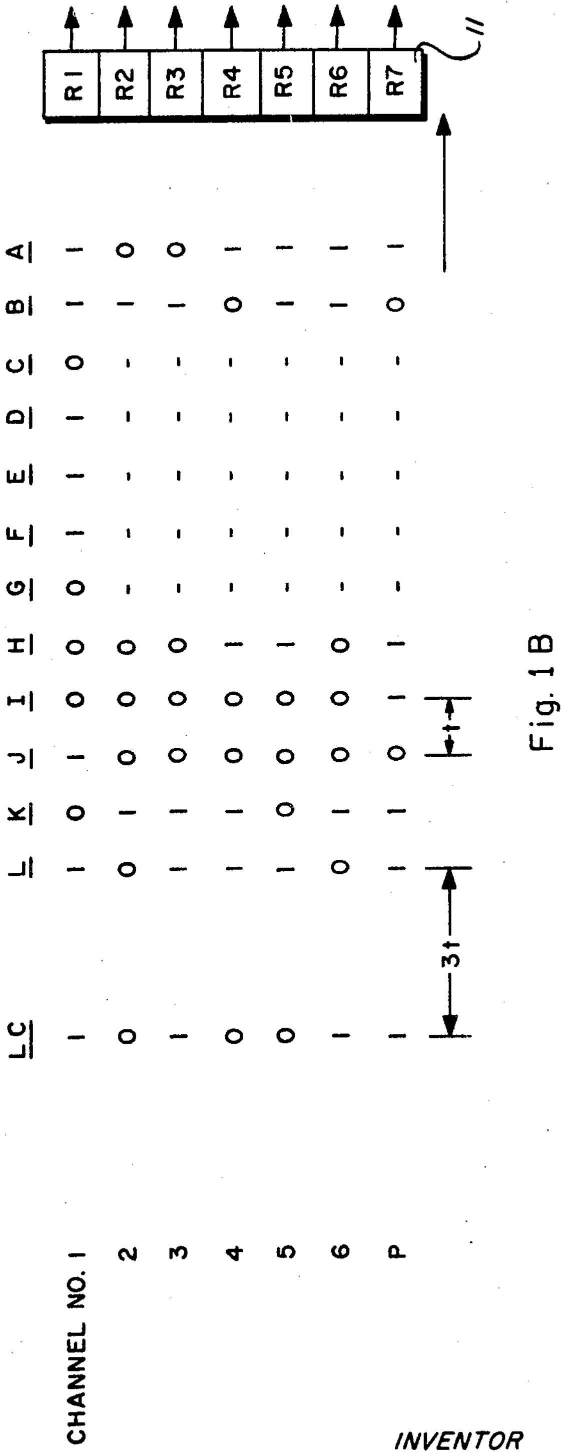

The binary digit information recorded on tape is illustrated in FIG. 1B for a record having six channels and a parity bit channel and is representative of the manner in which data is actually recorded on tape in a practical application. The information content of Channel No. 1, is represented by the waveform of FIG. 1A. The information is organized into successive groupings or frames of binary digits designated A to L. The digits within each frame are seen to be aligned in a direction transverse to the length of the tape. Successive data frames within a record occur regularly at frame period intervals which are designated by the latter *t*. In one practical embodiment of the invention, *t* may have a duration of the order of 17 microseconds. The long check frame, which is labeled LC in FIG. 1B, is seen to be spaced from the last data frame L of the record by approximately three frame period intervals. An inter-record gap IRG exists to either side of the record, to space the latter from the preceding and subsequent records respectively on the magnetic medium. In a practical embodiment of the invention, the inter-record gap may have a length of the order of ¾ inch.

FIG. 1B further illustrates a read station 11 consisting of a group of read heads R1 to R7. These are typically positioned immediately adjacent to a corresponding group of write heads (not shown) in a read-after write arrangement of the kind discussed above. The motion of the tape occurs in the direction indicated by the arrow in the drawing.

Figures 2, 3:
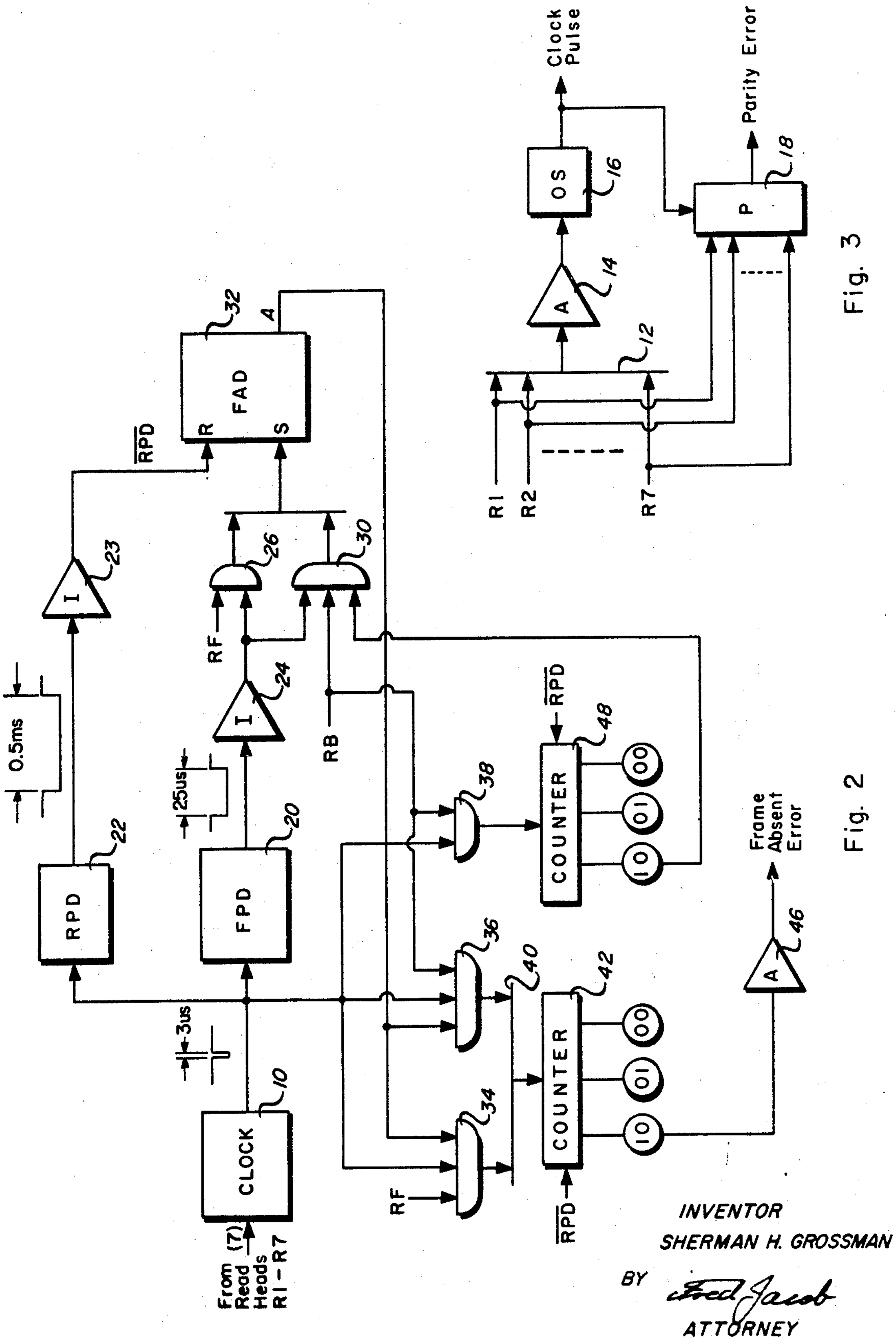
FIG. 2 illustrates a preferred embodiment of the present invention.
FIG. 3 illustrates in greater detail a component portion of the apparatus of FIG. 2.

FIGS. 2 and 3 illustrate a preferred embodiment of the present invention for implementing the frame dropout detection technique which forms the subject matter of the present application. As indicated by the numeral 7 in parentheses, the information from the read heads R1 to R7 arrives on seven lines at a read-after-write clock circuit 10. The latter is shown in greater detail in FIG. 3 and is seen to consist of a buffer 12 for buffering the signals derived from the read heads R1 to R7 to the input of an amplifier 14. The output of the amplifier 14 is applied to a one shot multivibrator 16, or the functional equivalent thereof, to produce a clock pulse at its output having a duration of the order of 3 microseconds in a preferred embodiment of the invention. FIG. 3 further shows a parity check unit 18 whose input is connected to the read heads R1 to R7 and which further receives the aforesaid clock signal. The parity check circuit provides an output signal which is designated Parity Error, such signal being derived in the event proper parity is not obtained for particular frame being read out.

The output of the clock circuit 10 is further applied to the input of a frame present detector 20, as well as to a record present detector 22. Each of these circuits is capable of providing an output pulse initiated by the leading edge of the clock pulse and ending a predetermined time interval following the trailing edge of the clock pulse. An example of a circuit of this kind is found in Pat. No. 3,146,430, by Nelson W. Burke, which is assigned to the assignee of the present invention. In the preferred embodiment of the invention shown in FIG. 2, the FPD pulse is seen to have a duration of 25 microseconds, while the RPD pulse has a duration of ½ millisecond.

The FPD pulse is further applied to an inverter 24, the output of which is coupled to one input respectively, of a pair of gates 26 and 30. A Read Forward signal RF, the function of which will be explained in greater detail hereinbelow, is applied to another input of the gate 26. The output of the gate 26 is buffered, jointly with the output of the gate 30, to the set input of a frame absent detector 32, which may consist essentially of a flip-flop circuit. The output of the record present detector 22 is coupled to an inverter 23 whose output, designated $\overline{RPD}$, is applied to the reset input of the frame absent detector 32.

The clock pulse is further coupled to one input of each of a set of gates 34, 36 and 38 respectively. Gates 34 and 36 are each further connected to receive a signal derived at the assertive output of the flip-flop 32 which constitutes the frame absent detector. The gate 34 is further connected to receive the aforesaid Read Forward signal at another input. Gates 36 and 38 are additionally connected to receive a Read Backward signal RB at respective inputs thereof. The outputs of the gates 34 and 36 are jointly buffered to a frame counter 42. The latter is further connected to receive the aforesaid $\overline{RPD}$ signal, which is adapted to reset the counter to the count of 0. The counter 42 may consist of a pulse counter of a type well known in the art. It is shown connected to the input of an amplifier 46, schematically indicative of the fact that the amplifier receives a signal when the count of 1 is exceeded. A frame absent error signal is derived at the output of the amplifier 46.

The output of the gate 38 is connected to a frame counter 48, which may be similar in construction to the counter 42. The counter 48 is similarly connected to receive the signal $\overline{RPD}$ adapted to reset the count to 0. The output of the counter 48 is shown connected to one input of the aforesaid gate 30, schematically indicative of the application of a signal to the latter gate when the count of 1 is exceeded. The gate 30 further receives a Read Backward signal at another input thereof.

The readout of the magnetic tape may occur in the forward direction, as indicated by the arrow in FIG. 1B, or in the backward direction. Suitable enabling signals RF and FB are generated for the respective modes of operation by means not shown and forming no part of the present invention. Conventionally the heads R1 to R7 are employed for checking as well as for readout purposes. In a read-after-write check, the tape is always moving in the forward direction. The recorded information is checked, but is not otherwise utilized. The readout of the recorded data may, however, be carried out with the tape moving in either direction.

Let it be assumed that the tape moves in the forward direction, as indicated by the arrow in FIG. 1B, a suitable Read Forward signal being generated in response thereto. It is further assumed that the flip-flop 32 is in its reset state and that the counters 42 and 48 are reset to the count of 0. The frame A, i.e. the first data frame of the record under consideration, moves under the read station 11 at an indeterminate time. As explained above, such time will depend on the length of the previous record, as well as on the length of the inter-record gap which is only approximately constant. Consistent with the data content of frame A which is illustrated in FIG. 1B, signals will be derived from the read heads R1, R4, R5, R6 and R7 due to transitions occurring in the corresponding channels. These signals are buffered to the input of the amplifier 14, whence they produce a clock pulse at the output of the one shot multivibrator 16.

As explained above, tape skewing, either during recording or during readout, or the misalignment of the recording heads and/or of the read heads, may prevent the readout pulses from occurring simultaneously. The first readout pulse to occur is buffered to the input of the amplifier 14 and energizes the one shot multivibrator 16 to provide a clock pulse having a duration of 3 microseconds. The generation of this clock pulse enables the circuit 18, which performs a parity check on the signals read out by the heads R1 to R7.

The clock pulse generated in response to the arrival of the first readout pulse is applied to the frame present detector 20 which, as previously explained, provides an output pulse of 25 microseconds duration in the preferred embodiment of the invention. The latter pulse is applied in logically inverted form to one input of the gate 26, which thus remains non-conductive for the pulse duration. Accordingly, the frame absent detector 32 remains in its reset state and no assertive output signal is generated. Barring an output signal from the latter pair of gates, the counter 42 remains in its reset condition and no frame absent error signal is generated.

With the arrival of frame B at the read station 17 microseconds later, another clock pulse is generated to energize the frame present detector 20. Since each output pulse of the unit 20 has a duration of 25 microseconds, the output signal of the unit 20 is not permitted to revert to its zero voltage level. Accordingly, as long as at least one transition is obtained for each frame of the record read out, i.e. at intervals of 17 microseconds, the FPD signal will remain at its negative level.

Let it be assumed that there has been no loss of information in reading out the record under consideration. Accordingly, the negative output signal level of the frame present detector 20 is maintained as frames A through L move under the read station. It follows that no frame absent error signal is generated during this time interval. Like the data frames preceding it, frame L is again responsible for generating a pulse at the output of the frame present detector 20 having a duration of 25 microseconds. As previously explained, the long check frame which contains a binary digit in each channel per record adapted to bring all data in bits in the same channel to an even number, is spaced from the last-occurring data frame by an interval of approximately $3t$. With the frame period interval $t$ chosen to be 17 microseconds in the preferred embodiment of the invention, the interval between the frame L and the long check frame is approximately 51 microseconds.

Twenty-five microseconds after the initiation of the clock pulse, the output signal of the frame present detector 20 reverts to zero. Accordingly, the output of the inverter 24 becomes true and the gate 26, having been enabled by the presence of the Read Forward signal RF, becomes conductive to apply a signal to the set input of the frame absent detector 32. As the latter unit is set, the assertive output signal becomes true and is applied to one input of the gate 34. Inasmuch as the tape transport is still operating in the Read Forward mode, an RF signal is applied to another input of the gate 34.

With the arrival of the long check frame under the read station, a clock pulse is generated which is applied to the third input of the gate 34 to render the latter conductive. The resultant output signal increments the counter 42 to the count of 1. The next inter-record gap immediately follows the long check frame and no further clock pulses are received until the arrival of the succeeding record at the read station 11. One-half millisecond after the occurrence of the clock pulse generated by the long check frame, the signal $\overline{RPD}$ becomes true and the flip-flop 32 and the counter 42 are reset. Thus, the counter 42 is never incremented beyond the count of 1 and hence no frame absent error signal is generated for this record.

As will be seen from FIG. 2, each clock pulse is further applied to the record present detector 22, at the output of which a signal RPD having a duration of the order of ½ microsecond is provided. In the same manner as explained above in connection with the operation of the frame present detector 20, the signal RPD remains at its negative level throughout the arrival of data frames A through L at the read station. Due to the long period of the RPD pulse, the aforesaid negative signal level is also present in the $3t$ interval between the last data frame L and the long check frame LC. The inter-record gap which follows the long check frame may have a length of the order of ¾ inch, as explained above. Thus, ½ millisecond after the occurrence of the long check frame, the RPD signal reverts to the zero level. As a consequence, the $\overline{RPD}$ signal becomes true and the frames absent detector 32, as well as the frame counters 42 and 48 respectively, are reset.

In the data frame I of FIG. 1B, the parity bit is seen to constitute the only binary 1. Specifically, a transition occurs only in the parity channel for frame I. If due to dust or the like, this transition failed to be recorded, or if it failed to be read out, a clock pulse is not generated by the clock 10. As a consequence, the parity check, which would ordinarily detect the absence of the parity bit, cannot be carried out since the circuit 18 is enabled only by a clock pulse. While the long check bit for the parity channel would normally show up the error, this cannot be relied on because of the statistical possibility of the occurrence of a complementing error in the same channel of the record.

For the purpose of the present discussion, it will be assumed that no previous error has occurred in the record so that the frame absent detector 32, as well as the frame counters 42 and 48, are all in their reset state, conditioned by the occurrence of the signal $\overline{RPD}$ during the inter-record gap. Assuming tape movement to be in the forward direction, the last-occurring clock pulse was generated by transitions in the frame H. The responsive pulse, generated at the output of the frame present detector 20, lasts for 25 microseconds, i.e. approximately $1.5t$. Due to the loss of the transition in frame I, a clock pulse fails to appear within this time period to generate another FPD pulse. The FPD signal therefore reverts to the zero level and a true signal is applied to one input of gate 26 from the output of inverter 24. In the presence of the concurrent RF signal, the gate 26 then becomes conductive and causes the frame absent detector 32 to be set. The assertive output signal of the latter unit is applied to the gate 34, jointly with the RF signal.

The arrival of the frame K at the read station 11 again causes a clock pulse to be generated. The application of this clock pulse to the gate 34 produces an output signal which increments the count of the frame counter 42 to the count of 1. As the frame J moves under the read station, a clock pulse is again generated which produces a signal at the output of the gate 34, the remaining gate inputs being true. Thus the count of the frame counter 42 is incremented to 2 and a pulse is applied to the amplifier 46. This pulse produces a frame absent error signal, indicative of the dropout of the data frame I.

The present invention is thus capable of detecting a frame dropout without having to guarantee more than one transition per frame. While maximum flexibility in the positioning of the data is thus preserved in the body of the record, certain constraints are required to guarantee reliable operation under all conditions. Specifically, it is important for the last two data frames of each record, frames K and L in FIG. 1B, to contain at least one detectable transition. To this end, it is a requirement of the subject invention to provide a relatively large number of binary 1's in the last two data frames.

The possible consequence of failing to abide by this requirement will be readily recognized from the following discussion. Thus, if a dropout of the frame L were to occur, the flip-flop 32 would be set, as explained hereinabove, and the gate 34 would become conductive to increment the count of the frame counter 42 to the count of 1. Upon the occurrence of the long check frame after an interval of approximately $4t$, the counter 42 would be incremented to 1. In the absence of a further frame during an interval in excess of half a millisecond, the $\overline{RPD}$ signal again becomes true to reset the flip-flop 32. as well as the frame counter 42. Thus, the frame count would never reach the required count of 2 to produce an error signal. Accordingly, the dropout of the frame L under these conditions would not be recognized and the frame K would be treated as the last data frame of the record.

It is similarly desirable to prevent any dropout of the frame K by providing a relatively large number of binary 1's therein, even though no dropout of the frame L occurs. The reason therefore lies in the fact that the long check frame does not necessarily contain a transition. The binary digit in each channel of the long check frame is entirely determined by the binary digits in the data frames of the same channel which, by definition, must add up to an even number with the long check digit. Thus, it is possible for all the long check bits to be 0's, so that no transition exists in the long check frame.

If, under these conditions, the frame K were to drop out, the flip-flop 32 would produce an output signal at its assertive output 25 microseconds after the occurrence of the frame J. The appearance of the frame L at the read station 11 would result in a single clock pulse to increment the frame counter 42 to the count of 1. With the long check frame consisting entirely of 0's, no further clock pulses would be generated in the same record and the counter 42 would never reach the count of 2. The dropout of the frame K would therefore remain undetected since, in effect, the system would treat the data frame L as a long check frame under these conditions.

The ability of the tape transport to be read out in the backward direction makes it necessary for the frame dropout detection technique to operate in this mode. Under these conditions, a Read Backward signal RB is generated to enable the gates 30, 36 and 38 respectively. In FIG. 1B of the drawings, the record, prior to readout in this mode, would appear to the right of the read station 11. The long check frame is the first frame to arrive under the read station in this mode. The application of a clock pulse of 3 microseconds duration to the gate 38 renders the latter conductive to increment the count of the frame counter 48 to the count of 1. Upon the subsequent arrival of the data frame L at the read station, a further clock pulse is generated, which again renders the gate 38 conductive. The frame counter 48 is now incremented to the count of 2 to apply a signal to the gate 30. The gate 30 does not, however, become conductive until the output of the inverter 24 becomes true. As long as clock pulses are generated at intervals of less than 25 microseconds by data frames arriving in succession at the read station 11, the gate 30 remains non-conductive because the output signal of the inverter 24 remains false.

Let it again be assumed that the parity bit of the frame I is missing so that no transitions occur in that frame. Twenty-five microseconds after the occurrence of the leading edge of the clock pulse generated by the presence of the frame J at the read station 11, the output pulse of the frame present detector 20 goes to zero and the output signal of the inverter 24 becomes true. The count of 2 having been exceeded by the counter 48, the gate 30 now becomes conductive and sets the flip-flop 32. The resultant signal, derived at the assertive output of the flip-flop 32, is applied to one input of the gate 36. The Read Backward signal is applied to another input of the gate 36. Upon the arrival of a clock pulse due to the next data frame, in this case the clock pulse generated by the frame H, the gate 36 becomes conductive and the count of the frame counter 42 is incremented to the count of 1. The arrival of one more data frame, in this case the frame G, is required before the count of the frame counter 42 is incremented to 2. When this occurs, a frame absent error signal is generated at the output of the amplifier 46.

If there are not frame dropouts in the record, the arrival of the data frame A at the read station during backward readout acts in the same manner as the arrival of the data frame L when the tape is moving in the forward direction. Specifically, half a millisecond after the arrival of the frame A, the output of the record present detector becomes false so that the $\overline{RPD}$ signal resets the frame absent detector 32, as well as the frame counters 42 and 48 respectively. Since counter 42 only reaches the count of 1 under these conditions, no frame absent error signal is generated.

As previously explained, the long check frame may legitimately consist entirely of binary 0's, in which form it cannot be detected by the read station. The read backward mode, however, requires the presence of at least two detectible frames prior to a frame dropout, before the latter is recognized. This requirement, which calls for a relatively large number of transitions in the frames K and L to render the possibility of their dropout remote, is consistent with the requirement for reliable readout in the forward direction.

It will be further clear from the discussion above that two detectible frames must follow each frame dropout before the latter is recognized during readout in the backward direction. This condition is similar to that encountered in the read forward mode. Accordingly, the frames B and A require a large number of transitions so that the dropout of these frames, which would go undetected during the read backward mode, becomes statistically improbable.

From the foregoing disclosure, it will be apparent that the present invention is directed to a technique for detecting the dropout of data frames in the operation of a tape transport, and is particularly applicable where magnetic tapes of narrow width are employed. The invention may be employed for tape readout in the forward or in the backward direction and provides a degree of reliability that was impossible of attainment in heretofore available prior art equipment. Such reliability is attained without any constraints on the positioning of the data in the body of each record and therefore permits maximum latitude in the formating of data.

The technique which forms the subject matter of the present invention is not limited to the preferred embodiment which is illustrated in the drawings. It will be apparent that numerous modifications, changes, and substitutions will now occur to those skilled in the art, all of which fall within the true spirit and scope contemplated by the present invention.

What is claimed is:

1. The method of checking the dropout of data frames successively recorded at frame period intervals in a first direction along the length of a multi-channel medium, the last recorded data frame being successed by a check frame spaced therefrom a distance exceeding two frame intervals, each frame being composed of a group of binary digits respectively recorded by the presence or absence of detectable indicia in the separate channels of said medium and in substantial mutual alignment transverse to the length of said medium, said method comprising the steps of:

providing at least one of said detectable indicia in each data frame, providing more than one of said indicia in the first and last two data frames respectively, reading out successive data frames in said first direction by generating a clock signal upon the successful detection of at least one of said indicia in each frame, initiating with each of said clock signals a time signal representing a timed interval having a duration in excess of a frame period interval but less than two frame period intervals, generating a frame absent signal upon the failure of a clock signal to occur within said timed interval readout in said first direction, counting the number of frames read out following the initiation of said last recited frame absent signal, and providing an error indication when said count exceeds a predetermined number.

2. The method of claim 1 and further comprising the steps of:

reading out successive, recorded frames in a direction opposite to said first direction, counting the number of frames read out in said opposite direction, generating a frame absent signal upon the failure of a clock signal to occur within said timed interval if said last recited count exceeds a predetermined number during readout in said second direction.

counting the number of frames read out following the initiation of said last recited frame absent signal, and providing an error indication when said last recited count exceeds a predetermined number.

3. Apparatus for checking the dropout of data frames successively recorded at frame period intervals in a multichannel magnetic medium, each frame being composed of a group of binary digits respectively recorded in the separate channels of said medium in substantial alignment transverse to said channels, comprising transducer means for reading out successive ones of said frames means responsive to said transducer means for providing a clock pulse for each frame successfully read out, means responsive to each of said clock pulses for providing a frame present signal of a duration in excess of one frame period interval, detection means for providing a frame absent signal at its ouput upon the failure of said frame present signal to appear, frame counting means, means responsive to the concurrence of a clock pulse and a frame absent signal to increment said counting means, and means for generating an error signal when the count of said last recited means exceeds a predetermined number.

4. Apparatus for checking the dropout of data frames successively recorded at frame period intervals in a multichannel magnetic medium, each frame being composed of a group of binary digits respectively recorded in the separate channels of said medium in substantial alignment transverse to said channels, comprising transducer means for reading out successive one of said frames in a first direction, means responsive to said stransducer means for providing a clock pulse for each frame successfully read out, means responsive to each of said clock pulses for providing a frame present signal of a duration in excess of one frame period interval, detection means for providing a frame absent signal at its output upon the failure of said frame present signal to appear during readout in said first direction, frame counting means, means responsive to the concurrence of a clock pulse and a frame absent signal during readout in said first direction to increment said counting means, and means for generating an error signal when the count of said last recited means exceeds a predetermined number.

5. The apparatus of claim 4 wherein said transducer means are further adapted to read out said frames in the oposite direction, additional frame counting means, means responsive to the occurrence of a clock pulse during readout in said opposite direction to increment said additional counting means, means for generating a signal when the count of said last recited means exceeds a predetermined number, means responsive to said last recited signal, upon the concurrent failure of a frame present signal to appear, for providing a frame absent signal at the output of said detection means during readout in said opposite direction, and means responsive to the concurrence of a clock signal and said frame absent signal during readout in said opposite direction to increment said first recited counting means.

6. Apparatus for checking the dropout of data frames successively recorded at frame period intervals along the length of a multi-channel magnetic medium, the last recorded data frame being succeeded by a check frame spaced therefrom a distance at least equal to two frame intervals, each frame being composed of a group of digits respectively recorded in the separate channels of said medium in substantial alignment transverse to the length thereof, comprising means for successively reading out said recorded frames in a first direction, means for generating a clock pulse of a first predetermined duration upon the successful readout of each frame, means responsive to the initiation of each of said clock pulse for generating a frame present signal of a second predetermined duration greater than said frame period interval, said last recited generating means being adapted to maintain said frame present signal upon the occurrence of clock pulses at frame period intervals, bistable means responsive to said last recited generating means during the readout of said data frames in said first direction for providing a frame absent signal upon the failurue of a clock pulse to occur during an interval of said second predetermined duration, first counting means adapted to increment a count upon each joint occurrence of a frame absent signal and a clock pulse during readout in said first direction, and means responsive to a predetermined count at the output of said first counting means to provide an error indication.

7. The apparatus of claim 6 and further includuing means for successively reading out said recorded frames in the opposite direction, second counting means adapted to increment a count upon each occurrence of a clock pulse during readout in said opposite direction, said bistable means being further responsive to said last recited generating means during readout in said opposite direction, upon the failure of a clock pulse to appear during said interval of second predetermined duration, to provide a frame absent signal when said second counting means reaches a predetermined count, an means for incrementing the count of said first counting means during readout in said opposite direction upon each joint occurrence of a frame absent signal and a clock pulse.

8. Apparatus for checking the dropout of data frames successively recorded at frame period intervals in a multichannel record, successive records appearing on a magnetic medium spaced from each other, each of said records being terminated by a single check frame spaced from said succession of data frames a distance in excess of two frame intervals, each frame being composed of a group of binary digits respectively recorded in the separate channels of said medium in substantial alignment transverse to said channels, comprising transducer means for reading out successive ones of said frames in a first direction, means responsive to said transducer means for providing a clock pulse for each frame successfully read out, the duration of each clock pulse being relatively small with respect to a frame period interval, detection means responsive to the leading edge of each of said clock pulses for providing a frame present pulse of a duration approximately one and one-half times that of said frame period interval, bistable means adapted to provide a first or second signal level at its output respectively representative of the presence or absence of said frames, means for resetting said bistable means following the termination of a record to generate said first signal level, means responsive to the failure of said frame present pulse to persist during readout in said first direction for setting said bistable means to generate said second signal level, frame counting means, means for resetting said counting means to the count of 0 following the termination of a record, means responsive to the concurrence of a clock pulse and said second signal level during readout in said first direction to increment said counting means, an means for generating an error signal when the count of said last recited means exceeds 1.

9. The apparatus of claim 8 wherein said transducer means are further capable of reading out said frames in the opposite direction, additional frame counting means, means for resetting said additional counting means to the count of 0 following the termination of a record, means responsive to the occurrence of a clock pulse during readout in said opposite direction to increment the count of said additional counting means, means for generating a signal when said last recited count exceeds 1, means responsive to said last recited signal upon the concurrent failure of a frame present pulse to appear during readout in said opposite direction for setting said bistable means to provide said second signal level, and means responsive to the concurrence of a clock signal and said second signal level during readout in said opposite direction to increment the count of said first recited counting means.

References Cited

UNITED STATES PATENTS

| | | | |
|---|---|---|---|
| 3,088,101 | 4/1963 | Schrimpf | 340—174.1 |
| 3,142,829 | 7/1964 | Comstock | 340—174.1 |
| 3,193,812 | 7/1965 | Friend | 340—174.1 |

MALCOLM A. MORRISON, Primary Examiner

C. E. ATKINSON, Assistant Examiner

U.S. Cl. X.R.

235—153; 340—174.1